UNITED STATES PATENT OFFICE.

CASIMIR FUNK, OF NEW YORK, N. Y., ASSIGNOR TO C. F. BOEHRINGER & SOEHNE, OF MANNHEIM-WALDHOF, GERMANY.

ART OF OBTAINING VITAMINS.

1,162,908.  Specification of Letters Patent.  Patented Dec. 7, 1915.

No Drawing.  Application filed April 8, 1915.  Serial No. 19,952.

*To all whom it may concern:*

Be it known that I, CASIMIR FUNK, citizen of Russia, residing at New York, N. Y., U. S. A., have invented certain new and useful Improvements in the Art of Obtaining Vitamins; and I do hereby declare the following to be a full, clear, and exact description of the invention, such as will enable others skilled in the art to which it appertains to make and use the same.

This invention relates to the art of isolating nitrogenous substances from food-products and, in particular, to the isolation of those bodies having great physiological value and generically designated as vitamins. These vitamins have in recent times been shown to be contained in various foodstuffs. For the separation of these vitamins from rice-bran, from yeast and similar products it has been proposed to submit concentrated extracts containing these substances to precipitation with phospho-tungstic acid, whereupon the resultant precipitate has been treated for isolating vitamin-containing products by rather complicated methods. Since only relatively small quantities of vitamins are contained in the precipitate due to phosphotungstic acid, the separation of these vitamins according to this method is accomplished only with extreme difficulty. My invention is based on the surprising discovery made by me, that by treating said precipitate with phosphotungstic acid with acetone, the major portion of said precipitate, containing the inactive ingredients, may be dissolved and eliminated, leaving almost all of the vitamins in the insoluble residue of the precipitate. Thus the percentage of vitamins in said precipitate may be so increased that the said vitamins may be isolated, generally in crystalline form, after decomposing the precipitate and evaporating or concentrating the solution. I have found that neutral lead-acetate is an effective agent for decomposing the precipitate produced by phosphotungstic acid. However, manifestly other known methods may be employed for said decomposition of the precipitate. The method described may be employed in the same manner for the treatment of organic extracts, such for example, as extract from the thyroid gland (scutiform glandule), to separate therefrom the active substances.

The following example embodies what I consider the preferred method of carrying out my invention.

Example: 350 grams of a moist precipitate obtained from yeast extract by means of phosphotungstic acid according to known methods is ground up in a large mortar, together with one-half a liter of acetone, whereby most of said precipitate goes into solution. The portion insoluble in acetone is separated by filtration and this residue then well-washed with acetone. The residue when dried weighs about 20 grams and hence represents only a minor portion of the entire precipitate produced with the phosphotungstic acid. This insoluble residue is then further treated by well mixing and grinding with a solution of neutral lead-acetate and then placed on the filter, the filtrate being then freed from excess of lead by leading hydrogen sulfid into the same. After filtering to separate the sulfid of lead formed, the filtrate is evaporated *in vacuo*. The resultant product is a white substance crystallizing in the form of needles and weighing from 0.2 to 0.3 grams. This resultant product is a vitamin having a definite chemical composition, whose complete identification is, however, difficult because it is contained only in very minute quantities in the starting material and because of the great difficulty of obtaining it in a pure state. This is, however, sufficient evidence to entitle us to consider vitamin a derivative of nicotinic acid and of a new chemical substance which melts at 223° C. and whose composition is expressed by the formula $C_{29}H_{23}O_9N_5$, and which shows certain analogies to pyrimidin bases. The physiological and therapeutical value of this substance has been made absolutely certain by the treatment of a large number of pigeons affected with beri-beri. The substance was found not only to cure beri-beri in these animals, but was proven to be the only ingredient which was necessary to be added to polished rice to make the same an adequate nourishment. It is a curative and a prophylactic agent for diseased pigeons fed on polished rice and is administered by injection. By such treatment not only is the onset of the disease prevented, but the appetite is stimulated and the animals are found to gain in weight on this otherwise very inadequate diet.

It is to be noted that by the term "vitamins," as employed in this specification and the claims, are to be understood not only vitamins strictly speaking, but also physiologically active substances from food-stuffs and organic extracts which are capable of favorably influencing diseases and disorders due to defective nourishment.

What I claim and desire to secure by Letters Patent is:

1. The process of isolating vitamins which comprises subjecting vitamin-containing substances to precipitation with phosphotungstic acid and then submitting the precipitate formed thereby to the action of acetone.

2. The process of isolating vitamins which comprises subjecting vitamin-containing substances to precipitation with phosphotungstic acid and then submitting the precipitate formed thereby to the action of acetone, then separating the resultant precipitate and treating the precipitate with lead-acetate to decompose the same.

In testimony whereof I hereunto affix my signature in the presence of two witnesses.

CASIMIR FUNK.

Witnesses:
 LIZZIE U. SMITH,
 JAMES O. POILLON.